(12) United States Patent
Saitoh et al.

(10) Patent No.: US 11,091,400 B2
(45) Date of Patent: Aug. 17, 2021

(54) ADMIXTURE FOR HYDRAULIC COMPOSITION

(71) Applicants: SIKA TECHNOLOGY AG, Baar (CH); TOHO CHEMICAL INDUSTRY CO., LTD., Tokyo (JP)

(72) Inventors: Kaname Saitoh, Hiratsuka (JP); Toshihiro Ogawa, Hiratsuka (JP); Michael Wernher Danzinger, Tuffenwies (CH); Akira Suga, Sodegaura (JP); Taro Tsushima, Sodegaura (JP); Seiichi Koshisaka, Sodegaura (JP)

(73) Assignees: SIKA TECHNOLOGY AG, Baar (CH); TOHO CHEMICAL INDUSTRY CO., LTD., Tokyo (JP)

( * ) Notice: Subject to any disclaimer, the term of this patent is extended or adjusted under 35 U.S.C. 154(b) by 188 days.

(21) Appl. No.: 16/484,695

(22) PCT Filed: Feb. 8, 2018

(86) PCT No.: PCT/JP2018/004433
§ 371 (c)(1),
(2) Date: Aug. 8, 2019

(87) PCT Pub. No.: WO2018/147378
PCT Pub. Date: Aug. 16, 2018

(65) Prior Publication Data
US 2020/0055785 A1 Feb. 20, 2020

(30) Foreign Application Priority Data
Feb. 8, 2017 (JP) .............................. JP2017-021713

(51) Int. Cl.
| C04B 40/00 | (2006.01) |
| C04B 24/26 | (2006.01) |
| C04B 24/30 | (2006.01) |
| C04B 28/02 | (2006.01) |
| C04B 103/12 | (2006.01) |
| C04B 103/30 | (2006.01) |
| C04B 111/21 | (2006.01) |

(52) U.S. Cl.
CPC ...... C04B 40/0039 (2013.01); C04B 24/2694 (2013.01); C04B 24/302 (2013.01); C04B 28/02 (2013.01); C04B 2103/12 (2013.01); C04B 2103/302 (2013.01); C04B 2111/21 (2013.01)

(58) Field of Classification Search
CPC .................................................. C04B 24/302
See application file for complete search history.

(56) References Cited

U.S. PATENT DOCUMENTS

| 5,362,829 A | 11/1994 | Kinoshita et al. |
| 5,707,445 A | 1/1998 | Yamato et al. |
| 5,912,284 A * | 6/1999 | Hirata ................. C08F 290/062 524/5 |
| 7,910,640 B2 | 3/2011 | Wieland et al. |
| 9,018,337 B2 | 4/2015 | Chen et al. |
| 10,487,170 B2 * | 11/2019 | Suga ........................ C08G 8/08 |

(Continued)

FOREIGN PATENT DOCUMENTS

| JP | S59-18338 A | 1/1984 |
| JP | 2628486 B2 | 7/1997 |
| JP | 2774445 B2 | 7/1998 |
| JP | 3235002 B2 | 12/2001 |
| JP | 3346456 B2 | 11/2002 |
| JP | 2003-327459 A | 11/2003 |
| JP | 2005-213082 A | 8/2005 |

(Continued)

OTHER PUBLICATIONS

Apr. 10, 2018 Search Report issued in International Patent Application No. PCT/JP2018/004433.
Apr. 10, 2018 Written Opinion of the International Searching Authority issued in International Patent Application No. PCT/JP2018/004433.

*Primary Examiner* — Michael M Dollinger
(74) *Attorney, Agent, or Firm* — Oliff PLC

(57) ABSTRACT

An admixture for a hydraulic composition includes a polycondensation product P containing a copolymer prepared by polycondensation of a monomer mixture containing compounds A to C of the following Formulae (A) to (C); and a polycarboxylic acid-based polymer Q including a structural unit having an amino and an imino group, and/or a structural unit having an amino, imino, and amido group:

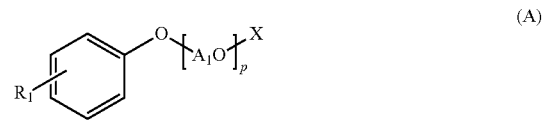

(A)

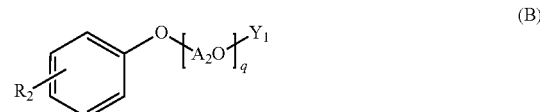

(B)

$R_3$ —— CHO, HO(CH$_2$O)$_r$H or (CH$_2$O)$_3$ (C)

(wherein $R_1$ is a hydrogen atom, alkyl, or alkenyl group; $A_1O$ is a $C_{2-4}$ alkylene oxide group; p is a number of 1 to 300; and X is a hydrogen atom, an alkyl, or acyl group; $R_2$ is an alkyl or alkenyl group; $A_2O$ is a $C_{2-4}$ alkylene oxide group; q is a number of 1 to 300; and $Y_1$ is a phosphate ester group; and $R_3$ is a hydrogen atom, carboxy, alkyl, alkenyl, phenyl, naphthyl, or heterocyclic group; and r is a number of 1 to 100).

14 Claims, No Drawings

(56) References Cited

U.S. PATENT DOCUMENTS

| | | |
|---|---|---|
| 2008/0108732 A1 | 5/2008 | Wieland et al. |
| 2013/0331539 A1 | 12/2013 | Chen et al. |
| 2015/0080500 A1* | 3/2015 | Dierschke ............... C04B 24/30 524/3 |
| 2016/0319072 A1 | 11/2016 | Kraus et al. |

FOREIGN PATENT DOCUMENTS

| | | | | |
|---|---|---|---|---|
| JP | 3740641 B2 | | 2/2006 | |
| JP | 3780456 B2 | | 5/2006 | |
| JP | 2007-197261 A | | 8/2007 | |
| JP | 2007197261 A | * | 8/2007 | ......... C04B 40/0039 |
| JP | 2013-503926 A | | 2/2013 | |
| JP | 2014-503667 A | | 2/2014 | |
| JP | 5507809 B2 | | 5/2014 | |
| JP | 2017-502140 A | | 1/2017 | |
| WO | 2011/029711 A1 | | 3/2011 | |

* cited by examiner

ADMIXTURE FOR HYDRAULIC COMPOSITION

TECHNICAL FIELD

The present invention relates to a novel admixture for a hydraulic composition and a combination for preparation of an admixture for a hydraulic composition.

BACKGROUND ART

In the civil engineering and construction industry, industrial by-products (e.g., fly ash and blast-furnace slag fine powder) have been actively used for the purposes of economical use of resources and reduction of environmental burdens in recent years. In association with recent depletion of natural aggregates in Japan, shale-derived sand or gravel (i.e., crushed sand or crushed stone) has been widely used as an aggregate for concrete.

However, the use of fly ash containing a large amount of unburned carbon or the use of crushed sand and stone containing a large amount of lignite depending on the rock type as a hydraulic powder or aggregate for concrete causes a problem in that unburned carbon or fine lignite powder segregates on the surface of a concrete hardened body, and thus black color spotting (i.e., blackening) occurs on the surface of the hardened body, resulting in a very poor appearance. It has also been reported that a plant-derived organic substance contained in the aforementioned lignite may be eluted in a highly alkaline cement paste, resulting in discoloration of the cement paste.

In order to solve such problems caused by various reasons (e.g., blackening on the surface of a mortar or cement hardened body), an additive for preventing blackening composed of a phosphate ester disclosed in, for example, Patent Document 1 or 2 has been conventionally proposed for improving the appearance of the surface of the hardened body.

However, when such an additive for preventing blackening is mixed with a water-reducing agent to thereby prepare an admixture for a hydraulic composition, a certain combination of the additive and the water-reducing agent may cause generation of a slightly water-soluble gelatinous material, resulting in a limitation on formulation; for example, hard to form a one-pack composition.

Incorporation of a large amount of an inorganic powder (e.g., fly ash) into a cement composition may cause problems, such as retardation of setting, bleeding, and a decrease in initial strength. Thus, such problems have also been required to be solved.

PRIOR ART DOCUMENTS

Patent Documents

Patent Document 1: Japanese Patent Application Publication No. 2005-213082 (JP 2005-213082 A)
Patent Document 2: Japanese Patent Application Publication No. 2007-197261 (JP 2007-197261 A)

SUMMARY OF THE INVENTION

Problems to be Solved by the Invention

In view of the aforementioned problems, an object of the present invention is to provide an admixture for a hydraulic composition that suppresses blackening caused by segregation of colored fine particles contained in a hydraulic composition on the surface of a hardened body, suppresses retardation of setting, bleeding, and a decrease in initial strength even when containing a large amount of an inorganic powder, and exhibits excellent water-reducing ability.

Means for Solving the Problems

The present inventors have conducted extensive studies and, as a result, have found that when a polycondensation product containing a phenolic copolymer formed of monomer components (i.e., a phenol-alkylene oxide adduct or a derivative thereof and a phosphate ester derivative of a phenol-alkylene oxide adduct) is used in combination with a polycarboxylic acid-based polymer including, for example, a structural unit having an amino group and an imino group, this combination use can effectively prevent blackening on the surface of a hardened body of a hydraulic composition containing colored fine particles, the blackening resulting from segregation of the colored fine particles on the hardened body surface.

The present inventors have also found that when the polycondensation product and the polycarboxylic acid-based polymer are used in combination with a hydraulic composition, the resultant mixture exhibits excellent water-reducing ability and can suppress retardation of setting, bleeding, and a decrease in initial strength. The present invention has been accomplished on the basis of these findings.

Accordingly, the present invention is directed to an admixture for a hydraulic composition comprising a polycondensation product P containing a copolymer prepared by polycondensation of a monomer mixture containing a compound A of the following Formula (A), a compound B of the following Formula (B), and one or more aldehyde compounds C of the following Formula (C), and a polycarboxylic acid-based polymer Q including a structural unit having an amino group and an imino group, and/or a structural unit having an amino group, an imino group, and an amido group:

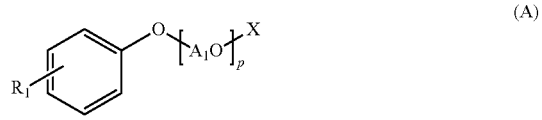

(A)

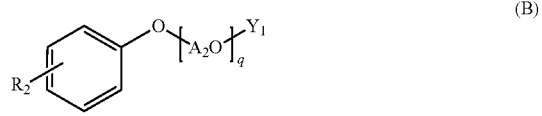

(B)

(C)

(wherein $R_1$ is a hydrogen atom, a $C_{1\text{-}24}$ alkyl group, or a $C_{2\text{-}24}$ alkenyl group; $A_1O$ is a $C_{2\text{-}4}$ alkylene oxide group; p is an average number of moles of alkylene oxide added and a number of 1 to 300; and X is a hydrogen atom, a $C_{1\text{-}10}$ alkyl group, or a $C_{2\text{-}24}$ acyl group;

$R_2$ is a $C_{4\text{-}24}$ alkyl group or a $C_{4\text{-}24}$ alkenyl group; $A_2O$ is a $C_{2\text{-}4}$ alkylene oxide group; q is an average number of moles of alkylene oxide added and a number of 1 to 300; and $Y_1$ is a phosphate ester group;

$R_3$ is a hydrogen atom, a carboxy group, a $C_{1\text{-}10}$ alkyl group, a $C_{2\text{-}10}$ alkenyl group, a phenyl group, a naphthyl group, or a heterocyclic group; and r is a number of 1 to 100).

In the polycondensation product P, the monomer mixture preferably further contains a compound D of the following Formula (D):

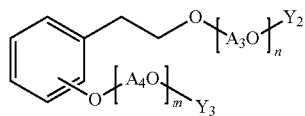

(D)

(wherein $A_3O$ and $A_4O$ are each independently a $C_{2-4}$ alkylene oxide group; m and n are each independently an average number of moles of alkylene oxide added and a number of 0 to 300, and m and n satisfy the following relation: m+n≥1; and $Y_2$ and $Y_3$ are each independently a hydrogen atom or a phosphate ester group).

In the polycondensation product P, the monomer mixture preferably contains the compound A, the compound B, and the compound D in proportions by mole; i.e., the compound A:the compound B:the compound D of 0.1 to 2:0.1 to 4:0 to 2, and the ratio by mole of the total of the compound A, the compound B, and the compound D to the compound C; i.e., (the compound A+the compound B+the compound D): the compound C is preferably 1 to 10:10 to 1.

In the polycondensation product P, the monomer mixture may contain two or more compounds A of Formula (A) and two or more compounds B of Formula (B).

In the polycarboxylic acid-based polymer Q, the structural unit having an amino group and an imino group is preferably derived from a polyalkylenepolyamine, and the structural unit having an amino group, an imino group, and an amido group is preferably derived from a polyamidepolyamine.

Preferably, the polyalkylenepolyamine contains a polyalkylene oxide-added polyalkylenepolyamine, and the polyamidepolyamine contains a polyalkylene oxide-added polyamidepolyamine.

The polyalkylenepolyamine or the polyamidepolyamine preferably has a molecular weight of 900 to 10,000.

In a preferred embodiment, the polycarboxylic acid-based polymer Q is a polymer including a copolymer unit prepared by copolymerization of a monomer mixture containing a monomer of the following Formula (1) and a monomer of the following Formula (2), and the structural unit having an amino group and an imino group, and/or the structural unit having an amino group, an imino group, and an amido group

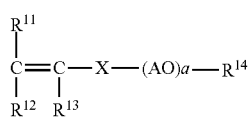

(1)

(wherein $R^{11}$, $R^{12}$, $R^{13}$, and $R^{14}$ are each independently a hydrogen atom or a $C_{1-22}$ hydrocarbon group; X is —COO—, —CON<, or —$(CH_2)_bO$—; AO is a $C_{2-4}$ alkylene oxide group; a is an average number of moles of alkylene oxide added and a number of 1 to 200; and b is a number of 1 to 20); and

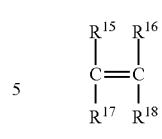

(2)

(wherein $R^{15}$, $R^{16}$, and $R^{18}$ are each independently a hydrogen atom, a $C_{1-22}$ hydrocarbon group, —$(CH_2)_c$—COOM, —COOM, —COOR$^{19}$ (wherein $R^{19}$ is a $C_{1-22}$ hydrocarbon group, —$(CH_2)_c$—COOM, —COOM, or a glycidyl group), or a glycidyl group, or $R^{15}$ and $R^{16}$ or $R^{17}$ and $R^{18}$ form an acid anhydride together with the >C=C< group in Formula (2); c is a number of 1 to 20; and M is a hydrogen atom, an alkali metal, an alkaline earth metal, ammonium, or an alkanolamine).

In the admixture for a hydraulic composition of the present invention, the mass ratio of the polycondensation product P to the polycarboxylic acid-based polymer Q; i.e., P:Q is preferably 1:99 to 99:1.

The present invention is also directed to a combination for preparation of an admixture for a hydraulic composition, the combination comprising a polycondensation product P containing a copolymer prepared by polycondensation of a monomer mixture containing a compound A of Formula (A), a compound B of Formula (B), and one or more aldehyde compounds C of Formula (C), and a polycarboxylic acid-based polymer Q including a structural unit having an amino group and an imino group, and/or a structural unit having an amino group, an imino group, and an amido group.

Effects of the Invention

The present invention can effectively reduce undesired effects in a hydraulic composition, wherein the undesired effects may be caused by the presence of a carbon component (typically, unburned carbon) in the hydraulic composition.

Specifically, each of the admixture for a hydraulic composition of the present invention and the combination for preparation of an admixture for a hydraulic composition of the present invention can exhibit high water-reducing ability even when incorporated into a concrete composition containing, for example, fly ash (FA). In particular, the admixture or the combination can suppress blackening on the surface of a concrete hardened body formed from the FA-containing composition, the blackening resulting from segregation of unburned carbon on the concrete surface. Thus, the resultant hardened body has an excellent appearance. In addition, the admixture or the combination can suppress problems, including retardation of setting, bleeding, and a decrease in initial strength, even when the hydraulic composition contains a large amount of an inorganic powder, such as FA.

Since the polycondensation product P and the polycarboxylic acid-based polymer Q contained in the admixture for a hydraulic composition of the present invention have excellent compatibility, the admixture exhibits excellent one-pack stability. Since the polycondensation product P and the polycarboxylic acid-based polymer Q contained in the combination for preparation of an admixture for a hydraulic composition of the present invention have excellent compatibility, the combination can be used at a work site without causing separation of these two components.

MODES FOR CARRYING OUT THE INVENTION

<Conjecture on Mechanism of Prevention of Blackening>

The admixture for a hydraulic composition of the present invention and the combination for preparation thereof exhibit the effect of producing a hydraulic composition hardened body with reduced blackening on its surface.

In general, black spotting or overall blackening on the surface of a concrete hardened body is probably due to the fact that black fine powder, such as ignition loss substance, carbonized substance, or carbon (hereinafter such black fine powder may be referred to as "colored fine particles") contained in cement, aggregate, admixture, etc. migrates in, for example, high-fluidity self-compactable concrete toward its surface particularly when vibration is applied to the concrete. It is not known in detail why the admixture for a hydraulic composition of the present invention can suppress blackening on the surface of a concrete hardened body. However, the reason for this is probably due to the fact that colored fine particles are adsorbed on the hydrophobic moiety of the polycondensation product P described below, and then the adsorbed colored fine particles and the polycondensation product P are adsorbed on a cement material via an anionic group introduced by a phosphate ester derivative (compound B), whereby the colored fine particles are immobilized on the cement surface, resulting in suppression of blackening on the surface of the concrete hardened body.

The polycondensation product P has good compatibility with the polycarboxylic acid-based polymer Q, and each of these materials does not lose its function even after formation of a one-pack composition. Thus, the presence of these materials probably leads to the following effects: an improvement in the dispersibility and retention of a hydraulic composition, a reduction in setting time, an increase in strength, and an improvement in material separation resistance.

A variety of colored concrete materials each containing an inorganic or organic pigment have been marketed for improving the appearance of a concrete hardened body. However, such a colored concrete material may suffer from color unevenness due to non-uniform dispersion of pigment particles in the material. In contrast, the use of the admixture for a hydraulic composition of the present invention enables production of a colored concrete material having no color unevenness by improving the dispersibility of pigment particles through adsorption of the particles onto the admixture.

<Colored Fine Particles>

Examples of the powder containing the aforementioned colored fine particles include fly ash (coal ash), iron and steel slag, copper slag, silica fume, stone dust, calcium carbonate, charcoal, other carbon powders, and mixtures of any of these and cement, such as fly ash cement, blast furnace cement, and silica fume cement. Examples of the aggregate containing colored fine particles include crushed sand and crushed stone produced from lignite-containing shale, molten slag sand, and ferronickel slag sand. The admixture for a hydraulic composition of the present invention is directed to a hydraulic composition containing cement as a main component, such as cement paste, mortar, and concrete. From the viewpoint of, for example, a reduction in workload, the admixture for a hydraulic composition remarkably exhibits its effect particularly when it is directed to concrete. Specific examples of the hydraulic material include portland cement, blast furnace cement, silica fume cement, fly ash cement, alumina cement, natural gypsum, and by-produced gypsum. The hydraulic composition to which the admixture for a hydraulic composition of the present invention is directed may contain an aggregate containing almost no colored fine particles. Examples of the aggregate include a fine aggregate and a coarse aggregate. The fine aggregate is preferably mountain sand, land sand, river sand, and crushed sand. The coarse aggregate is preferably mountain gravel, land gravel, river gravel, crushed stone, and tight sands. A lightweight aggregate may be used depending on the intended use of the hydraulic composition.

<Admixture for Hydraulic Composition and Combination for Preparation of Admixture for Hydraulic Composition>

The admixture for a hydraulic composition of the present invention contains the polycondensation product P and polycarboxylic acid-based polymer Q described below. The combination for preparation of an admixture for a hydraulic composition of the present invention contains the polycondensation product P and polycarboxylic acid-based polymer Q described below.

The polycondensation product P and the polycarboxylic acid-based polymer Q will next be described in detail.

[Polycondensation Product P]

The polycondensation product P used in the present invention contains a copolymer prepared by polycondensation of a monomer mixture containing a phenol-alkylene oxide adduct or a derivative thereof (a compound A of Formula (A)), a phosphate ester derivative of a phenol-alkylene oxide adduct (a compound B of Formula (B)), and an aldehyde (one or more aldehyde compounds C of Formula (C)), and optionally a hydroxyethylphenol-alkylene oxide adduct or a derivative thereof (a compound D of Formula (D)) (i.e., the copolymer is a polycondensation copolymer of the monomer mixture).

As used herein, the "polycondensation product P containing a copolymer prepared by polycondensation of a monomer mixture" includes all of the following modes:

(1) a mode containing a copolymer (copolymer 1) prepared by polycondensation of all of the compounds A to C in the monomer mixture;

(2) a mode containing a copolymer (copolymer 2) prepared by polycondensation of all of the compounds A to D in the monomer mixture;

(3) a mode containing a copolymer (copolymer 3) prepared by polycondensation of two of the compounds A to C in the monomer mixture;

(4) a mode containing a copolymer (copolymer 4) prepared by polycondensation of one or two of the compounds A to C and the compound D in the monomer mixture;

(5) a mode containing two or more of the copolymers described in (1) to (4) above; and (6) a mode containing one or more of the copolymers described in (1) to (4) above and at least one of unreacted compounds A to D, and generally includes other components, for example, unreacted components and side reaction products generated in polymerization processes and preparation processes for components (compounds A to D), such as an alkylene oxide addition process.

The compounds A to D contained in the monomer mixture will next be described in detail.

«Compound A of Formula (A)»

The compound A is a phenol-alkylene oxide adduct or a derivative thereof and has a structure of the following Formula (A).

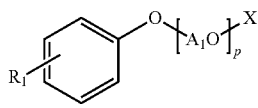

(A)

In Formula (A), $R_1$ is a hydrogen atom, a $C_{1-24}$ alkyl group, or a $C_{2-24}$ alkenyl group; $A_1O$ is a $C_{2-4}$ alkylene oxide group; p is an average number of moles of alkylene oxide added and a number of 1 to 300; and X is a hydrogen atom, a $C_{1-10}$ alkyl group, or a $C_{2-24}$ acyl group.

The compound A is a compound prepared by addition of a $C_{2-4}$ alkylene oxide to phenol or a substitution product thereof. The compound A also includes a derivative (alkyl ester or fatty acid ester) of the alkylene oxide adduct.

Examples of the $C_{2-4}$ alkylene oxide include ethylene oxide, propylene oxide, and butylene oxide. These alkylene oxides can be added alone or in combination. When two or more alkylene oxides are used, the addition form may be a block addition form or a random addition form.

Examples of the $C_{2-4}$ alkylene oxide group in $A_1O$ include ethylene oxide group, propylene oxide group, and butylene oxide group. $A_1O$ may consist of only an ethylene oxide group, a propylene oxide group, or a butylene oxide group, or may include two or more of these groups. When $A_1O$ includes the two or more groups, the addition form thereof may be a random addition form or a block addition form.

In Formula (A), p is an average number of moles of alkylene oxide added, and p is 1 to 300, preferably 1 to 150. An increase in the number of moles of alkylene oxide added in $A_1O$ can lead to an expectation of improved water-reducing ability.

Examples of the $C_{1-24}$ alkyl group in $R_1$ include methyl group, ethyl group, propyl group, butyl group, pentyl group, hexyl group, heptyl group, octyl group, nonyl group, decyl group, dodecyl group (lauryl group), tetradecyl group (myristyl group), hexadecyl group (palmityl group), octadecyl group (stearyl group), icosyl group, docosyl group (behenyl group), and tetracosyl group. The $C_{1-24}$ alkyl group may have a branched structure (e.g., isopropyl group, isobutyl group, sec-butyl group, tert-butyl group, or neopentyl group) and/or a cyclic structure (e.g., cyclopropyl group, cyclopentyl group, cyclohexyl group, or 1-adamantyl group).

The $C_{2-24}$ alkenyl group corresponds to a group obtained by replacement of one carbon-carbon bond in a $C_{2-24}$ alkyl group among the aforementioned $C_{1-24}$ alkyl groups with a carbon-carbon double bond. Specific examples of the $C_{2-24}$ alkenyl group include ethenyl group, propenyl group, butenyl group, pentenyl group, hexenyl group, heptenyl group, octenyl group, nonenyl group, decenyl group, dodecenyl group, tetradecenyl group, hexadecenyl group, octadecenyl group, eicosenyl group, docosenyl group, and tetracosenyl group. The $C_{2-24}$ alkenyl group may have a branched structure and/or a cyclic structure.

The $C_{1-10}$ alkyl group in X may have a branched structure and/or a cyclic structure. Specific examples of the $C_{1-10}$ alkyl group include $C_{1-10}$ alkyl groups that are exemplified as specific examples of the $C_{1-24}$ alkyl group in $R_1$.

Examples of the $C_{2-24}$ acyl group include saturated or unsaturated acyl groups (R'(CO)— group, wherein $R^1$ is a $C_{1-23}$ hydrocarbon group). Examples of the saturated $C_{2-24}$ acyl group include acyl groups derived from carboxylic acids and fatty acids, such as acetic acid, propionic acid, butanoic acid, pentanoic acid, hexanoic acid (caproic acid), heptanoic acid, octanoic acid (caprylic acid), nonanoic acid, decanoic acid (capric acid), dodecanoic acid (lauric acid), tetradecanoic acid (myristic acid), pentadecanoic acid (pentadecylic acid), hexadecanoic acid (palmitic acid), heptadecanoic acid (margaric acid), octadecanoic acid (stearic acid), nonadecanoic acid, eicosanoic acid (arachidic acid), docosanoic acid (behenic acid), and tetracosanoic acid (lignoceric acid). Examples of monounsaturated acyl groups include acyl groups derived from monounsaturated fatty acids, such as myristoleic acid, palmitoleic acid, oleic acid, elaidic acid, vaccenic acid, gadoleic acid, eicosenoic acid, erucic acid, and nervonic acid. Examples of diunsaturated acyl groups include acyl groups derived from diunsaturated fatty acids, such as linoleic acid, eicosadienoic acid, and docosadienoic acid. Examples of triunsaturated acyl groups include acyl groups derived from triunsaturated fatty acids, such as linolenic acid, pinolenic acid, eleostearic acid, mead acid, dihomo-γ-linolenic acid, and eicosatrienoic acid.

In particular, X is preferably a hydrogen atom and an acetyl group.

The compounds A of Formula (A) may be used alone or in combination of two or more species.

«Compound B of Formula (B)»

The compound B is a phosphate ester derivative of a phenol-alkylene oxide adduct and has a structure of the following Formula (B).

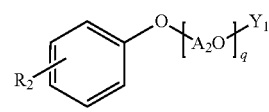

(B)

In Formula (B), $R_2$ is a $C_{4-24}$ alkyl group or a $C_{4-24}$ alkenyl group; $A_2O$ is a $C_{2-4}$ alkylene oxide group; q is an average number of moles of alkylene oxide added and a number of 1 to 300; and $Y_1$ is a phosphate ester group.

The compound B is a phosphate ester derivative of a compound prepared by addition of a $C_{2-4}$ alkylene oxide to phenol or a substitution product thereof.

Examples of the $C_{2-4}$ alkylene oxide include ethylene oxide, propylene oxide, and butylene oxide. These alkylene oxides can be added alone or in combination. When two or more alkylene oxides are used, the addition form may be a block addition form or a random addition form.

Examples of the $C_{2-4}$ alkylene oxide group in $A_2O$ include ethylene oxide group, propylene oxide group, and butylene oxide group. $A_2O$ may consist of only an ethylene oxide group, a propylene oxide group, or a butylene oxide group, or may include two or more of these groups. When $A_2O$ includes the two or more groups, the addition form thereof may be a random addition form or a block addition form.

In Formula (B), q is an average number of moles of alkylene oxide added, and q is 1 to 300, preferably 1 to 40.

Each of the $C_{4-24}$ alkyl group and the $C_{4-24}$ alkenyl group in $R_2$ may have a branched structure and/or a cyclic structure. Specific examples thereof include $C_{4-24}$ alkyl groups and $C_{4-24}$ alkenyl groups that are exemplified as specific examples of the $C_{1-24}$ alkyl group and $C_{2-24}$ alkenyl group in $R_1$ of the compound A (Formula (A)).

When $R_2$ in the compound B is a $C_{4-24}$ alkyl group (alkyl substitution product), fluidity is improved in the case where fly ash (FA) serving as a hydraulic powder is incorporated into the hydraulic composition, and blackening can be suppressed on the surface of a hardened body formed from the FA-containing hydraulic composition. An increase in the length of the carbon chain of $R_2$ can lead to an expectation of improved appearance of the hardened body formed from the FA-containing hydraulic composition.

Since $Y_1$ is a phosphate ester group, the compound B is a phosphate monoester and/or a salt thereof, a phosphate diester and/or a salt thereof, a phosphate triester, or a mixture thereof.

Examples of the salt of the phosphate ester (monoester or diester) include salts of an alkali metal, such as sodium or potassium; salts of a group II metal, such as calcium or magnesium; ammonium salts; and organic ammonium salts, such as alkylammonium or alkanolammonium.

Examples of the compound B of Formula (B) include compounds of the following formulae.

In the following formulae, $R_2$, $A_2O$, and q are the same as defined above in Formula (B). Ph is a phenylene group. M' is a hydrogen atom; an alkali metal atom, such as sodium or potassium; an alkaline earth metal atom, such as calcium or magnesium; an ammonium group; or an organic ammonium group, such as an alkylammonium group or an alkanolammonium group.

Z is a polyoxyalkylene alkyl ether residue of Formula: R"—O-(A'O)s- (wherein R" is a $C_{1-24}$ alkyl group; A'O is a $C_{2-3}$ oxyalkylene group; i.e., an oxyethylene group or an oxypropylene group; and s is an average number of moles of oxyalkylene group A'O added and is 1 to 100). When a plurality of residues Z are present, the residues Z may be identical to or different from one another.

Phosphate Monoester and Salt Thereof

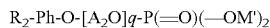

Phosphate Diester and Salt Thereof

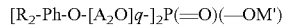

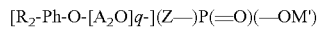

Phosphate Triester

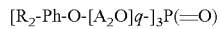

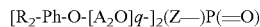

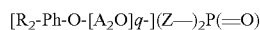

The compounds B of Formula (B) may be used alone or in combination of two or more species.

«Aldehyde Compound C of Formula (C)»

The compound C is an aldehyde and has a structure of the following Formula (C).

In Formula (C), $R_3$ is a hydrogen atom, a carboxy group, a $C_{1-10}$ alkyl group, a $C_{2-10}$ alkenyl group, a phenyl group, a naphthyl group, or a heterocyclic group, and r is a number of 1 to 100.

The alkyl group, alkenyl group, phenyl group, naphthyl group, and heterocyclic group may be substituted with any substituent; for example, a $C_{1-10}$ alkyl group; an aryl group, such as a phenyl group or a naphthyl group; a halogen atom, such as a chlorine atom or a bromine atom; a sulfonate functional group, such as a sulfo group or a sulfonate salt group; an acyl group, such as an acetyl group; a hydroxy group; an amino group; or a carboxy group.

Each of the $C_{1-10}$ alkyl group and the $C_{2-10}$ alkenyl group in $R_3$ may have a branched structure or a cyclic structure. Specific examples thereof include $C_{1-10}$ alkyl groups and $C_{2-10}$ alkenyl groups that are exemplified as specific examples of the $C_{1-24}$ alkyl group and $C_{2-24}$ alkenyl group in $R_1$ of the compound A (Formula (A)).

Examples of the heterocyclic group include furyl group, thienyl group, pyridyl group, piperidyl group, and morpholino group.

In Formula (C), r is preferably a number of 2 to 100.

Examples of the compound C include formaldehyde, paraformaldehyde, trioxane, glyoxylic acid, acetaldehyde, trichloroacetaldehyde, propionaldehyde, butyraldehyde, isobutyraldehyde, valeraldehyde, hexylaldehyde, heptanal, octylaldehyde, nonylaldehyde, isononylaldehyde, decylaldehyde, dodecanal, acrolein, crotonaldehyde, pentenal, hexenal, heptenal, octenal, cinnamaldehyde, benzaldehyde, benzaldehydesulfonic acid, benzaldehydedisulfonic acid, anisaldehyde, salicylaldehyde, benzylaldehyde [$(C_6H_5)_2C$(OH)—CHO], naphthaldehyde, and furfural. In particular, the compound C is preferably selected from the group consisting of formaldehyde, paraformaldehyde, benzaldehyde, and any mixture of two or more of these.

The compound C may be used in the form of a pure crystal or powder, or a hydrate thereof. Alternatively, the compound C can be used in the form of an aqueous solution, such as formalin. In such a case, the measurement or mixing of components can be simplified.

The compounds C of Formula (C) may be used alone or in combination of two or more species.

«Compound D of Formula (D)»

The compound D is a hydroxyethylphenol-alkylene oxide adduct or a derivative thereof and has a structure of the following Formula (D).

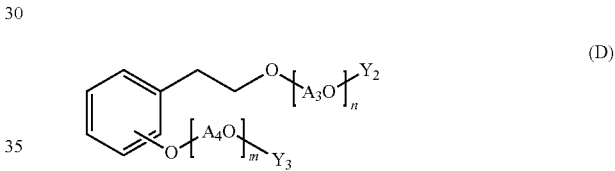

In Formula (D), $A_3O$ and $A_4O$ are each independently a $C_{2-4}$ alkylene oxide group; m and n are each independently an average number of moles of alkylene oxide added and a number of 0 to 300, and m and n satisfy the following relation: $m+n \geq 1$.

$Y_2$ and $Y_3$ are each independently a hydrogen atom or a phosphate ester group.

The compound D is a compound prepared by addition of a $C_{2-4}$ alkylene oxide to hydroxyethylphenol; specifically, at least one or both of a hydroxyethyl group and a phenolic hydroxy group. The compound D also includes a derivative (phosphate ester) of the alkylene oxide adduct.

The hydroxyethylphenol may be any of o-hydroxyethyl-phenol, m-hydroxyethyl-phenol, and p-hydroxyethyl-phenol. The compound D is preferably a compound prepared by addition of a $C_{2-4}$ alkylene oxide to o-hydroxyethyl-phenol (and an ester derivative of the compound).

Examples of the $C_{2-4}$ alkylene oxide include ethylene oxide, propylene oxide, and butylene oxide. These alkylene oxides can be added alone or in combination. When two or more alkylene oxides are used, the addition form may be a block addition form or a random addition form.

Examples of the $C_{2-4}$ alkylene oxide group in $A_3O$ and $A_4O$ include ethylene oxide group, propylene oxide group, and butylene oxide group. Each of $A_3O$ and $A_4O$ may consist of only an ethylene oxide group, a propylene oxide group, or a butylene oxide group, or may include two or more of these groups. When $A_3O$ or $A_4O$ includes the two or more groups, the addition form thereof may be a random addition form or a block addition form.

In Formula (D), m and n are each independently an average number of moles of alkylene oxide added and a number of 0 to 300, preferably 0 to 60, and m and n satisfy the following relation: m+n≥1. An increase in the number of moles of alkylene oxide added in $A_3O$ or $A_4O$ can lead to an expectation of improved water-reducing ability.

When $Y_2$ or $Y_3$ is a phosphate ester group, the compound D is a phosphate monoester and/or a salt thereof, a phosphate diester and/or a salt thereof, a phosphate triester, or a mixture thereof.

Examples of the salt of the phosphate ester (monoester or diester) include salts of an alkali metal, such as sodium or potassium; salts of a group II metal, such as calcium or magnesium; ammonium salts; and organic ammonium salts, such as alkylammonium or alkanolammonium.

When a terminal of the compound D is anionized; i.e., the compound D is formed into a phosphate ester derivative, mortar kneading time can be shortened upon addition of the admixture to a hydraulic composition.

The compounds D of Formula (D) may be used alone or in combination of two or more species.

«Monomer Mixture»

The polycondensation product P used in the present invention involves the use of the monomer mixture containing the compounds A to C and optionally the compound D. In the monomer mixture, no particular limitation is imposed on the proportions of these compounds. Preferably, the monomer mixture contains the compound A, the compound B, and the compound D in proportions by mole; i.e., the compound A:the compound B:the compound D of 0.1 to 2:0.1 to 4:0 to 2, and the ratio by mole of the total of the compound A, the compound B, and the compound D to the compound C; i.e., (the compound A+ the compound B+ the compound D): the compound C is 1 to 10:10 to 1.

More preferably, the proportions of the compound A:the compound B:the compound D are 0.5 to 1.5:0.5 to 3.5:0 to 1.0 (by mole), and the ratio of (the compound A+ the compound B+ the compound D): the compound C is 2 to 6:10 to 1 (by mole).

«Copolymer and Polycondensation Product»

The polycondensation product P used in the present invention contains a copolymer prepared by polycondensation of the monomer mixture containing the compounds A to C and optionally the compound D.

No particular limitation is imposed on the method for producing the compounds A to D used for preparation of the copolymer, and the polymerization method for the copolymer.

No particular limitation is imposed on the order of addition of the compound A, the compound B, the compound C, and the compound D, and the method of adding the compounds during polycondensation. For example, the total amount of the compounds A to D may be added in one time before the polycondensation reaction; a portion of the compounds A to D may be added before the polycondensation reaction, and then the remaining portion may be added dropwise in a divided manner; or a portion of the compounds A to D may be added before the polycondensation reaction, and the remaining portion may be added after the elapse of a certain period of reaction time.

The polycondensation product is prepared by, for example, polycondensation of the compound A, the compound B, the compound C, and the compound D at a reaction temperature of 80° C. to 150° C. and at ambient pressure or under pressurized conditions (e.g., 0.001 to 1 MPa (gauge pressure)) in the presence of a dehydration catalyst and in the presence or absence of a solvent.

Examples of the dehydration catalyst include hydrochloric acid, perchloric acid, nitric acid, formic acid, methanesulfonic acid, octylsulfonic acid, dodecylsulfonic acid, vinylsulfonic acid, allylsulfonic acid, phenolsulfonic acid, acetic acid, sulfuric acid, diethyl sulfate, dimethyl sulfate, phosphoric acid, oxalic acid, boric acid, benzoic acid, phthalic acid, salicylic acid, pyruvic acid, maleic acid, malonic acid, nitrobenzoic acid, nitrosalicylic acid, p-toluenesulfonic acid, benzenesulfonic acid, dodecylbenzenesulfonic acid, trifluoromethanesulfonic acid, fluoroacetic acid, thioglycolic acid, mercaptopropionic acid, and activated clay. These dehydration catalysts may be used alone or in combination of two or more species.

When the polycondensation reaction is performed in the presence of a solvent, the solvent used may be water, a glycol ether compound, such as propylene glycol monomethyl ether (PGME), an aromatic compound, such as toluene or xylene, or an alicyclic compound, such as methylcyclohexane. Furthermore, the solvent used may be any of the aforementioned dehydration catalysts (acid catalysts), such as acetic acid.

The polycondensation reaction can be performed at a reaction temperature of preferably 95° C. to 130° C. The polycondensation reaction can be completed through 3 to 25-hour reaction.

The polycondensation reaction is preferably performed under acidic conditions. The pH of the reaction system is preferably adjusted to 4 or less.

Besides the compound A, the compound B, the compound C, and the compound D, an additional monomer that can be polycondensed with the compounds may be incorporated in the monomer mixture, so long as the effects of the present invention are not impaired.

Examples of the additional monomer include adducts of cresol, catechol, resorcinol, nonylphenol, methoxyphenol, naphthol, methylnaphthol, butylnaphthol, bisphenol A, aniline, methylaniline, hydroxyaniline, methoxyaniline, and/or salicylic acid with 1 to 300 mol of alkylene oxide, phenol, phenoxyacetic acid, methoxyphenol, resorcinol, cresol, bisphenol A, nonylphenol, aniline, methylaniline, N-phenyldiethanolamine, N,N-di(carboxyethyl)aniline, N,N-di(carboxymethyl)aniline, phenolsulfonic acid, and anthranilic acid.

After completion of the polycondensation reaction, the amount of an unreacted aldehyde component (compound C) contained in the reaction system can be reduced by any conventionally known method. Examples of the method include a method involving adjustment of the pH of the reaction system to an alkaline pH, followed by thermal treatment at 60 to 140° C.; a method involving reduction of the pressure in the reaction system (e.g., to a gauge pressure of −0.1 to −0.001 MPa) to thereby remove the aldehyde component through volatilization; and a method involving addition of a small amount of sodium hydrogen sulfite, ethylene urea, and/or polyethyleneimine.

After completion of the polycondensation reaction, the dehydration catalyst used in the reaction may be neutralized into a salt form, and then the salt may be removed by filtration. However, if the catalyst is not removed, the performance of the admixture for a hydraulic composition of the present invention is not impaired as described below. Examples of the technique for removing the catalyst include, besides the aforementioned filtration, phase separation, dialysis, ultrafiltration, and use of an ion exchanger.

The neutralization of the reaction product and dilution thereof with, for example, water improve the workability (e.g., measurement) during use of the admixture for a hydraulic composition as described below. Examples of the basic compound used for the neutralization include alkali hydroxides, such as sodium hydroxide and potassium hydroxide; alkaline earth metal hydroxides, such as calcium hydroxide; and organic amines, such as ammonia, monoethanolamine, diethanolamine, and triethanolamine. One or two species of these basic compounds may be used.

The finally produced copolymer has a weight average molecular weight (as measured by gel permeation chromatography (hereinafter referred to as "GPC") in terms of polyethylene glycol) of appropriately 5,000 to 100,000, more preferably 10,000 to 80,000, particularly preferably 15,000 to 35,000, from the viewpoint of achievement of excellent dispersion performance.

As described above, the "polycondensation product" in the present invention may consist of only the copolymer prepared by polycondensation of the monomer mixture containing the compounds A to D. However, the polycondensation product generally includes other components, such as unreacted components and side reaction products generated in, for example, polymerization processes and an alkylene oxide addition process.

[Polycarboxylic Acid-Based Polymer Q]

The polycarboxylic acid-based polymer Q used in the present invention is a polycarboxylic acid-based polymer including a structural unit having an amino group and an imino group, and/or a structural unit having an amino group, an imino group, and an amido group.

The polycarboxylic acid-based polymer plays a role as a dispersant in the hydraulic composition. The use of the polycarboxylic acid-based polymer can lead to an expectation of preparation of a concrete material having reduced slump loss.

In the polycarboxylic acid-based polymer Q, the structural unit having an amino group and an imino group is derived from a compound having an amino group and an imino group, or the structural unit having an amino group, an imino group, and an amido group is derived from a compound having an amino group, an imino group, and an amido group.

The compound having an amino group and an imino group or the compound having an amino group, an imino group, and an amido group includes, in its unit structure, an amino group (i.e., primary amino group) and an imino group (i.e., secondary amino group) and optionally an amido group (not essential) formed through condensation between a carboxylic acid and the amino group or the imino group, wherein the amount of each of the amino group, the imino group, and the amido group is at least one mole relative to one mole of the unit structure.

The aforementioned compound may be a low-molecular-weight compound or a polymer compound. Examples of the low-molecular-weight compound include compounds derived from, for example, an aliphatic, alicyclic, or aromatic amine (e.g., ethylamine, ethyleneamine, diethylamine, or aniline), a heterocyclic amine (e.g., 1-benzofuran-2-ylamine or 4-quinolylamine), an aliphatic imine (e.g., hexylideneamine or isopropylideneamine), an aliphatic, alicyclic, or aromatic amide (e.g., acetamide, benzamide, or lactam), hydroxylamine, and an acid amide, and having an amino group and an imino group, and/or an amino group, an imino group, and an amido group. Other examples include adducts prepared by addition of, for example, an oxygen- or nitrogen-containing functional group (e.g., alkylene oxide) or a halogen (fluorine, bromine, or iodine)-containing substituent to any of the aforementioned compounds. Examples of the polymer compound include compounds derived from any of the aforementioned low-molecular-weight compounds, for example, compounds prepared by polymerization of one or more of the exemplified compounds, polyalkylenepolyamines, and polyamidepolyamines.

The aforementioned compound has a molecular weight of 900 to 10,000, preferably 900 to 3,000, more preferably 900 to 2,000. In such a case, the compound is specifically a polyalkylenepolyamine or a polyamidepolyamine, and the compound may be a polyalkylene oxide-added polyalkylenepolyamine or polyamidepolyamine.

In a suitable embodiment, the structural unit having an amino group and an imino group is preferably a structural unit derived from a polyalkylenepolyamine, and the polyalkylenepolyamine may include a polyalkylene oxide-added polyalkylenepolyamine.

The structural unit having an amino group, an imino group, and an amido group is preferably a structural unit derived from a polyamidepolyamine, and the polyamidepolyamine may include a polyalkylene oxide-added polyamidepolyamine.

Examples of the polyalkylenepolyamine include mixtures of polyethylenepolyamine; i.e., a polymer formed of ethylenediamine, diethylenetriamine, triethylenetetramine, tetraethylenepentamine, pentaethylenehexamine, hexaethyleneheptamine, or a mixture containing large amounts of ethylene units and nitrogen atoms; cyclic imine polymers, such as polyethyleneimine, polypropyleneimine, poly-3-methylpropylimine, and poly-2-ethylpropylimine; and unsaturated amine polymers, such as polyvinylamine and polyallylamine. The polyalkylenepolyamine may be a copolymer of a cyclic imine (e.g., ethyleneimine, propyleneimine, 3-methylpropylimine, or 2-ethylpropylimine), an unsaturated amide (e.g., N-vinylacetamide, N-vinylformamide, or N-vinylphthalimide), or an unsaturated imide with an unsaturated compound capable of being copolymerized with such a compound. Examples of the unsaturated compound capable of being copolymerized with, for example, a cyclic imine, an unsaturated amide, or an unsaturated imide include dimethylacrylamide, styrene, methyl acrylate, methyl methacrylate, acrylic acid, methacrylic acid, styrenesulfonic acid, and salts thereof; cyclic sulfide compounds, such as ethylene sulfide and propylene sulfide; cyclic ethers, such as oxetane, mono- or bis-alkyl oxetane, mono- or bis-alkyl chloromethyloxetane, tetrahydrofuran, and mono- or bis-alkyl tetrafluorofuran; cyclic formals, such as 1,2-dioxofuran and trioxofuran; and N-substituted alkylimines, such as N-methylethyleneimine.

The polyalkylene oxide-added polyalkylenepolyamine is a compound formed through copolymerization between at least two molecules of the aforementioned polyalkylenepolyamine and at least one molecule of an alkylene oxide. At least two molecules of the polyalkylenepolyamine forming the polyalkylenepolyamine-alkylene oxide copolymer may be the same compound or different compounds. Examples of the alkylene oxide include ethylene oxide, propylene oxide, and butylene oxide. These alkylene oxides may be used in combination. Of the aforementioned alkylene oxides, ethylene oxide is preferred from the viewpoint of an improvement in water-reducing effect. When two or more molecules of the alkylene oxide are copolymerized with two molecules of the polyalkylenepolyamine in the polyalkylenepolyamine-alkylene oxide copolymer, the alkylene oxide molecules may form a polyoxyalkylene chain through addition polymerization. Only one type of alkylene oxide may be used, or two or more types of alkylene oxide may be used. When a polyoxyalkylene chain is formed by two or more alkylene oxides, the two or more alkylene oxides forming the polyoxyalkylene chain may be bonded in a block or random form. When two or more polyoxyalkylene chains are present in one molecule of the polyalkylenepolyamine copolymer, the polyoxyalkylene chains may be identical to or different from one another.

Examples of the polyamidepolyamine include compounds formed through condensation polymerization between the aforementioned polyalkylenepolyamine and, for example, a dibasic acid, a dibasic acid anhydride, a dibasic acid ester, or a dibasic acid dihalide via an amide bond. Examples of the dibasic acid include $C_{2-10}$ aliphatic saturated dibasic acids, such as oxalic acid, malonic acid, succinic acid, glutaric acid, adipic acid, pimelic acid, suberic acid, azelaic acid, and sebacic acid. Examples of the dibasic acid anhydride include anhydrides of the aforementioned dibasic acids. Examples of the dibasic acid ester include monomethyl esters, monoethyl esters, monobutyl esters, monopropyl esters, dimethyl esters, diethyl esters, dibutyl esters, and dipropyl esters of the aforementioned dibasic acids. Examples of the dibasic acid dihalide include dichlorides, dibromides, and diiodides of the aforementioned dibasic acids.

The polyalkylene oxide-added polyamidepolyamine is a compound formed by addition of an alkylene oxide to an amino group, an imino group, or an amido group in one molecule of the aforementioned polyamidepolyamine. Examples of the alkylene oxide include ethylene oxide, propylene oxide, and butylene oxide. These alkylene oxides may be used alone or in combination. When two or more alkylene oxides are used, the alkylene oxides may be bonded in a block or random form.

The polycarboxylic acid-based polymer Q used in the present invention is preferably a polymer including a copolymer unit prepared by copolymerization of a monomer mixture containing a monomer of the following Formula (1) (hereinafter referred to as "monomer E") and a monomer of the following Formula (2) (hereinafter referred to as "monomer F"), and the aforementioned structural unit having an amino group and an imino group, and/or the aforementioned structural unit having an amino group, an imino group, and an amido group. Such a polymer can be prepared by copolymerization of the monomer E of the following Formula (1) and the monomer F of the following Formula (2), and a monomer including the aforementioned structural unit having an amino group and an imino group or the aforementioned structural unit having an amino group, an imino group, and an amido group (hereinafter the monomer will be referred to as "monomer G").

In the monomer E of the following Formula (1), $R^{11}$, $R^{12}$, $R^{13}$, and $R^{14}$ are each independently a hydrogen atom or a $C_{1-22}$ hydrocarbon group; X is —COO—, —CON<, or —(CH$_2$)$_b$—O—; and AO is a $C_{2-4}$ alkylene oxide group. In Formula (1), a is an average number of moles of alkylene oxide added, and a number of 1 to 200, more preferably 30 to 150. When X is —(CH$_2$)$_b$O—, b is a number of 1 to 20.

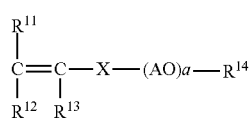

(1)

The monomer E of Formula (1) is more specifically a polyalkylene glycol monomer having polymerization activity. Examples of the polyalkylene glycol monomer include monomers each including a polymerization active group and a polyalkylene glycol as structural units; for example, alkenyl ethers formed of a $C_{3-8}$ alkenyl ether and an (alkoxy) alkylene glycol, such as polyalkylene glycol monoallyl ether, alkylene glycol monoalkenyl ether, methoxypolyalkylene glycol monoallyl ether, and methoxyalkylene glycol monoalkenyl ether; alkoxyalkylene glycol (meth)acrylates formed of (meth)acrylic acid and a $C_{1-22}$ alkoxypolyalkylene glycol, such as methoxypolyalkylene glycol, ethoxypolyalkylene glycol, or propoxypolyalkylene glycol; alkoxyalkylene glycol unsaturated fatty acid esters formed of a $C_{1-22}$ alkoxypolyalkylene glycol and an unsaturated fatty acid, such as oleic acid; alkoxyalkylene glycol amide compounds formed of an α-alkoxy-ω-amino-polyalkylene glycol having a terminal amino group and (meth)acrylic acid or an unsaturated fatty acid; and unsaturated aliphatic ethers; i.e., unsaturated aliphatic alcohol-alkylene oxide adducts. Such a polyalkylene glycol is formed of a $C_{2-4}$ alkylene oxide; specifically formed by single or mixed addition of ethylene oxide, propylene oxide, and/or butylene oxide. The mixed addition form may be a random addition form or a block addition form. These polyalkylene glycol monomers having polymerization activity may be used alone or in combination of plural species.

In the monomer F of the following Formula (2), $R^{15}$, $R^{16}$, $R^{17}$, and $R^{18}$ are each independently a hydrogen atom, a $C_{1-22}$ hydrocarbon group, —(CH$_2$)$_c$—COOM, —COOM, —COOR$^{19}$ (wherein $R^{19}$ is a $C_{1-22}$ hydrocarbon group, —(CH$_2$)$_c$—COOM, —COOM, or a glycidyl group), or a glycidyl group, or $R^{15}$ and $R^{16}$ or $R^{17}$ and $R^{18}$ form an acid anhydride together with the >C=C< group in Formula (2); c is a number of 1 to 20; and M is a hydrogen atom, an alkali metal, an alkaline earth metal, ammonium, or an alkanolamine.

(2)

Specific examples of the monomer F of Formula (2) include unsaturated fatty acids and ester derivatives thereof, such as maleic acid, maleic anhydride, itaconic acid, methacrylic acid, acrylic acid, maleic acid dialkyl esters, methacrylic acid alkyl esters, and acrylic acid alkyl esters; and glycidyl compounds, such as glycidyl methacrylate, glycidyl acrylate, and glycidyl allyl ether. Such a compound may be in an acid form or a neutralized form. The neutralization is performed with, for example, sodium, potassium, calcium, magnesium, ammonium ion, or alkanolamine. These acids or neutralized salts may be used alone or in combination of plural species.

The monomer G including the structural unit having an amino group and an imino group or the structural unit having an amino group, an imino group, and an amido group is, for example, a condensation product of the aforementioned compound having an amino group and an imino group or the aforementioned compound having an amino group, an imino group, and an amido group with acrylic acid, methacrylic acid, or an ester formed of acrylic acid or methacrylic acid and a $C_{1-4}$ lower alcohol. Specifically, the production method for the condensation product is described in, for example, Japanese Patent No. 3235002, 3346456, 3740641, or 3780456.

The copolymerization proportions of the monomer E, the monomer F, and the monomer G; i.e., E:F:G (by mass) are preferably 50 to 90:5 to 40:5 to 40 (the total of the proportions by mass of the monomer E, the monomer F, and the monomer G is 100), from the viewpoint of a reduction in slump loss.

No particular limitation is imposed on the production method for the copolymer. The copolymer can be produced by any known polymerization method, such as solution polymerization or bulk polymerization using a polymerization initiator.

The polycarboxylic acid-based polymer Q of the present invention may be prepared by copolymerization of the aforementioned monomers and an additional monomer capable of being copolymerized with these monomers, so long as the effects of the present invention are not impaired. Examples of the additional copolymerizable monomer component include the following known monomers: (non)aqueous monomers, such as styrene; anionic monomers, such as vinylsulfonic acid, styrenesulfonic acid, (meth)acrylic acid phosphate ester salt, and phosphate ester salt of (meth) acrylic acid-alkylene oxide adduct; amide monomers, such as acrylamide and acrylamide-alkylene oxide adduct; amine monomers, such as polyalkylenepolyimine compounds; polyalkylene glycol monomers, such as mono- or di-esters of a polyalkylene glycol and maleic anhydride, and esters of a polyalkylene glycol and itaconic acid. Such an additional monomer may be used in an amount of about 0 to 20% by mass relative to the total mass of the monomer E of Formula (1), the monomer F of Formula (2), the monomer G, and the additional monomer.

In the present invention, the structural unit having an amino group and an imino group and/or the structural unit having an amino group, an imino group, and an amido group included in the polycarboxylic acid-based polymer Q may be formed by bonding of the aforementioned compound having an amino group and an imino group and/or the compound having an amino group, an imino group, and an amido group to a polycarboxylic acid-based polymer $Q_0$ via a grafting group or a crosslinking group. No particular limitation is imposed on the polycarboxylic acid-based polymer $Q_0$, so long as it is a polycarboxylic acid-based polymer having a functional group that can be grafted or crosslinked with, for example, an acid group, an acid anhydride group, a glycidyl group, an acid ester group, the aforementioned compound having an amino group and an imino group, and/or the compound having an amino group, an imino group, and an amido group. The polycarboxylic acid-based polymer $Q_0$ is a copolymer prepared by, for example, copolymerization of the aforementioned monomer E and monomer F and optionally an additional monomer. Specific examples of the polycarboxylic acid-based polymer $Q_0$ include copolymers of maleic anhydride with polyalkylene glycol monoalkenyl ether; copolymers of maleic anhydride with allyl alcohol-alkylene oxide adduct monomethyl ether; copolymers of (meth)acrylic acid with (alkoxy) polyalkylene glycol (meth)acrylate; copolymers of (meth) acrylic acid with glycidyl (meth)acrylate and (alkoxy) polyalkylene glycol (meth)acrylate; copolymers of (meth) acrylic acid with a monomer having a sulfone group and (alkoxy)polyalkylene glycol (meth)acrylate; copolymers of (meth)acrylic acid with a monomer having a phosphate group and (alkoxy)polyalkylene glycol (meth)acrylate; and copolymers of (meth)acrylic acid with (meth)acrylic acid alkyl ester and (alkoxy)polyalkylene glycol (meth)acrylate.

The polycarboxylic acid-based copolymer Q used in the present invention preferably has a weight average molecular weight (as measured by gel permeation chromatography, in terms of polyethylene glycol) of 1,000 to 500,000. When the weight average molecular weight falls outside this range, water-reducing ability is considerably lowered, or a desired slump loss reducing effect cannot be achieved.

In the present invention, a reaction mixture containing the polycarboxylic acid-based copolymer Q produced by, for example, the aforementioned process may be used, as is, for the admixture for a hydraulic composition of the present invention and the combination for preparation of an admixture for a hydraulic composition of the present invention. In this case, the reaction mixture may contain, besides the polycarboxylic acid-based copolymer Q, unreacted components and side reaction products generated in, for example, a polymerization process, a grafting process, a crosslinking process, and an alkylene oxide addition process.

[Mixing Ratio]

In the admixture for a hydraulic composition of the present invention or the combination for preparation of an admixture for a hydraulic composition of the present invention, the mixing ratio (by mass) of the polycondensation product P to the polycarboxylic acid-based polymer Q; i.e., the polycondensation product P: the polycarboxylic acid-based polymer Q is 1:99 to 99:1, preferably 1:9 to 3:1, more preferably 1:5 to 1:1.

The admixture for a hydraulic composition containing the polycondensation product P and the polycarboxylic acid-based polymer Q, or the combination for preparation of an admixture for a hydraulic composition containing these components is used in an amount of generally 0.1 to 10% by mass, preferably 0.1 to 5% by mass in terms of solid content, relative to the mass of cement, or the total mass of cement and calcium carbonate (serving as an admixture) or pozzolanic fine powder (e.g., fly ash) when calcium carbonate or fly ash is used in combination with cement.

[Additional Additive]

The admixture for a hydraulic composition of the present invention or the combination for preparation of an admixture for a hydraulic composition of the present invention may be used in combination with an appropriately selected additive, such as a publicly known and used chemical admixture for hydraulic composition. Specifically, the admixture for a hydraulic composition or the combination may contain at least one additional concrete additive selected from the group consisting of a conventionally known cement dispersant, a high-performance AE water-reducing agent, a high-performance water-reducing agent, an AE water-reducing agent, a water-reducing agent, an air-entraining agent (AE agent), a foaming agent, an antifoaming agent, a setting retardant, a setting accelerator, a separation reducing agent, a thickener, a shrinkage reducing agent, a curing compound, and a water repellent, etc.

The admixture for a hydraulic composition or the combination for preparation of an admixture for a hydraulic composition to which the present invention is directed includes any of the following forms: one-pack admixture for a hydraulic composition containing the polycondensation product P and the polycarboxylic acid-based polymer Q; the admixture for a hydraulic composition further containing any known concrete additive; individual addition of the polycondensation product P and the polycarboxylic acid-based polymer Q during concrete production; individual addition of the polycondensation product P containing the concrete additive and the polycarboxylic acid-based polymer Q during concrete production; individual addition of the polycondensation product P and the polycarboxylic acid-based polymer Q containing the concrete additive during concrete production; and individual addition of the polycondensation product P containing the concrete additive and the polycarboxylic acid-based polymer Q containing the concrete additive during concrete production.

Examples of the known cement dispersant include salts of polycarboxylic acid-based copolymer described in Japanese Patent Publication No. S59-18338 and Publications of Japanese Patent Nos. 2628486 and 2774445, salts of naphthalene sulfonate formaldehyde condensate, salts of melamine sulfonate formalin condensate, ligninsulfonate salts, sodium gluconate, and sugar alcohol.

Specific examples of the air-entraining agent include anionic air-entraining agents, nonionic air-entraining agents, and amphoteric air-entraining agents.

Examples of the setting retardant include inorganic setting retardants and organic setting retardants.

Examples of the accelerator include inorganic accelerators and organic accelerators.

Examples of the thickener and the separation reducing agent include cellulose-based water-soluble polymers, polyacrylamide-based water-soluble polymers, biopolymers, and nonionic thickeners.

Examples of the antifoaming agent include nonionic antifoaming agents, silicone-based antifoaming agents, higher alcohols, and mixtures containing them as a main component.

The admixture for a hydraulic composition of the present invention or the combination for preparation of an admixture for a hydraulic composition of the present invention is suitable for use in a hydraulic composition, particularly suitable for use in a hydraulic composition containing coal ash, such as fly ash, cinder ash, clinker ash, or bottom ash, or pozzolanic fine powder, such as silica fume, silica dust, molten silica fine powder, blast furnace slag, volcanic ash, clay silicate, diatomaceous earth, metakaolin, silica sol, or precipitated silica.

When the admixture for a hydraulic composition of the present invention or the combination for preparation of an admixture for a hydraulic composition of the present invention is applied to a cement composition, the component forming the cement composition is a conventionally used component for concrete. Examples of the conventional component include cement (e.g., ordinary portland cement, high-early-strength portland cement, ultra high-early-strength portland cement, low-heat and medium-heat portland cement, or blast furnace cement), aggregates (e.g., fine aggregate and coarse aggregate), admixtures (e.g., silica fume, calcium carbonate powder, blast furnace slag powder, and fly ash), expansive additives, and water.

Examples of the admixture that is other than the admixture for a hydraulic composition of the present invention or the combination for preparation of an admixture for a hydraulic composition of the present invention and can be separately added during preparation include the aforementioned publicly known concrete additives, such as an air-entraining agent, a setting retardant, an accelerator, a separation reducing agent, a thickener, an antifoaming agent, and a shrinkage reducing agent. Such an additive may be appropriately incorporated. The amount of each component to be incorporated can be appropriately determined depending on the type of the component and the intended use thereof.

The admixture for a hydraulic composition of the present invention or the combination for preparation of an admixture for a hydraulic composition of the present invention exhibits excellent effects of suppressing blackening, reducing setting time, and increasing compressive strength. In addition, the admixture for a hydraulic composition or the combination exhibits excellent one-pack stability or compatibility, and excellent compatibility with water.

Thus, the admixture for a hydraulic composition or the combination is applied to a wide range of water/powder ratio. Specifically, the admixture for a hydraulic composition or the combination can be applied to concrete materials having different strengths at a water/powder ratio (% by mass) of 60 to 15%.

The admixture for a hydraulic composition of the present invention or the combination for preparation of an admixture for a hydraulic composition of the present invention is used in the same manner as a common admixture, such as a cement dispersant. For example, a stock solution of the admixture for a hydraulic composition or the combination is added during concrete kneading, or the stock solution is diluted with kneading water before addition. Alternatively, the admixture for a hydraulic composition or the combination may be added to previously kneaded concrete or mortar, and then the resultant mixture may be uniformly kneaded.

EXAMPLES

The present invention will next be described by way of examples. However, the present invention is not limited to the following examples and comparative examples.

In the examples, the physical properties of samples were measured with the following apparatuses under the following conditions. The term "part(s)" refers to "part(s) by mass."

(1) GPC (Gel Permeation Chromatography)

<Gel Permeation Chromatography (GPC) Measurement Conditions>

Column: OHpak SB-802.5HQ, OHpak SB-803HQ, OHpak SB-804HQ (available from Showa Denko K. K.)

Eluent: mixture of 50 mM aqueous sodium nitrate solution and acetonitrile (80/20 by volume)

Detector: differential refractometer, Calibration Curve: polyethylene glycol

<Preparation of Polycondensation Product P>

Example 1

Preparation of (A)

80 Parts of diethylene glycol monophenyl ether (Hisolve DPH, available from Toho Chemical Industry Co., Ltd.) and 0.2 parts of 96% potassium hydroxide were added to a stainless steel high-pressure reactor equipped with a thermometer, a stirrer, a pressure gauge, and a nitrogen-introducing tube. The interior of the reactor was purged with nitrogen, and the mixture was heated to 150° C. in a nitrogen atmosphere. While the temperature was maintained at 150° C. at a safe pressure, 1,700 parts of ethylene oxide was added to the reactor over 10 hours. Thereafter, the temperature was maintained for two hours, to thereby complete an alkylene oxide addition reaction and to prepare polyethylene glycol monophenyl ether (number of moles of EO added: 90).

Example 2

Preparation of (B)

<Preparation of EO Adduct> p-Tert-butylphenol (PTBP, available from DIC) or p-tert-octylphenol (POP, available from DIC) was used as a starting raw material. An ethylene oxide addition reaction was performed in the same manner as in the aforementioned preparation of (A). The number of moles of ethylene oxide added was 6 for each raw material.

<Phosphate Esterification>

3 Moles of a p-tert-butylphenol-EO adduct (6-mole adduct) or a p-tert-octylphenol-EO adduct (6-mole adduct) was added to a glass reactor equipped with a stirrer, a thermometer, and a nitrogen-introducing tube. 1 Mole of phosphoric anhydride was added to the reactor under nitrogen bubbling at 50° C. over four hours, to thereby allow reaction to proceed. Thereafter, an aging reaction was performed at 100° C. for three hours, to thereby complete a phosphate esterification reaction and to prepare a p-tert-butylphenol-EO adduct phosphate ester or a p-tert-octylphenol-EO adduct phosphate ester.

Example 3

Preparation of (D)

100 Parts of o-hydroxyethylphenol (a reagent available from Aldrich) and 0.3 parts of 96% potassium hydroxide were added to a stainless steel high-pressure reactor equipped with a thermometer, a stirrer, a pressure gauge, and a nitrogen-introducing tube. The interior of the reactor was purged with nitrogen, and the mixture was heated to 130° C. in a nitrogen atmosphere. While the temperature was maintained at 130° C. at a safe pressure, 190 parts of ethylene oxide was added to the reactor over four hours. Thereafter, the temperature was maintained for two hours, to thereby complete an alkylene oxide addition reaction and to prepare an o-hydroxyethylphenol-EO (6 mole) adduct.

Preparation Example 1

Preparation of Polycondensation Product (No. 6)

The raw materials (A), (B), and (D) were added in proportions by mole shown in Table 1 to a glass reactor equipped with a stirrer, a thermometer, and a reflux cooler. The mixture was heated to 70° C., and then 98% sulfuric acid was added to the reactor in an amount of 1.0 wt % relative to the total mass of the materials (A), (B), and (D). Subsequently, the raw material (C) was added in a proportion by mole shown in Table 1 to the reactor in one time, and then the mixture was heated to 105° C. When the temperature reached 105° C., the pH of the reaction mixture was 2.1 (1% aqueous solution, 20° C.). The reaction was completed six hours after the temperature reached 105° C., and the reaction mixture was neutralized with 48% sodium hydroxide so that the pH of the reaction mixture (1% aqueous solution) was 5.0 to 7.5. Thereafter, an appropriate amount of water was added so that the solid content of the reaction mixture was 40%, to thereby prepare an aqueous solution of a polycondensation product. The polycondensation product was subjected to GPC measurement, to thereby determine the weigh average molecular weight Mw of the product.

Preparation Examples 2 to 5

Preparation of Polycondensation Products (Nos. 7, 8, 10, and 11)

Aqueous solutions of polycondensation products were prepared in the same manner as in Preparation Example 1, except that the types of the raw materials (A) to (D) and their proportions by mole were changed as shown in Table 1.

TABLE 1

Formulation of Polycondensation Product P

| | (A) | | | (B) | | (C) | (D) (o-form in all) | | | Proportions (by mole) | | | | GPC |
|---|---|---|---|---|---|---|---|---|---|---|---|---|---|---|---|
| No. | $R_1$ | X | p | $R_2$ | $Y_1$ | q | Type | m | n | $Y_2/Y_3$ | A | B | C | D | Mw |
| 6 | H | H | 90 | p-t-Bu | Phosphate Es | 6 | Formalin | 3 | 3 | H | 1.0 | 2.0 | 5.0 | 0.5 | 23,000 |
| 7 | H | H | 90 | p-t-Bu | Phosphate Es | 6 | Formalin | 3 | 3 | H | 1.0 | 1.0 | 5.0 | 0.5 | 28,000 |
| 8 | H | H | 90 | p-t-Bu | Phosphate Es | 6 | Formalin | 3 | 3 | H | 1.0 | 3.0 | 5.0 | 0.5 | 17,000 |
| 10 | H | H | 90 | p-t-Bu | Phosphate Es | 6 | Formalin | — | — | — | 1.0 | 2.0 | 5.0 | — | 21,000 |
| 11 | H | H | 90 | p-t-Oc | Phosphate Es | 6 | Formalin | 3 | 3 | H | 1.0 | 2.0 | 5.0 | 0.5 | 22,000 |

Comparative Preparation Example 1

Preparation of Polycondensation Product of Comparative Example 1

A polycondensation product of Comparative Example 1 was prepared by the following procedure disclosed in the specification of Japanese Patent No. 5507809 (paragraph [0049] [Preparation of Polycondensation Product of the Present Invention B.1]).

Firstly, 1 mole of poly(ethylene oxide) monophenyl ether (1,000 g/mole), 2 moles of phenoxyethanol phosphate (or a mixture of 2-phenoxyethanol dihydrogen phosphate and 2-phenoyethanol hydrogen phosphate), 16.3 moles of water, and 2 moles of $H_2SO_4$ were added to a reactor and stirred. 3 Moles of formaldehyde in the form of 37% aqueous solution was added dropwise to the resultant mixture. A polycondensation reaction was performed at 105° C. for five hours. After completion of the reaction, the pH of the reaction mixture was adjusted to 10.5 with a 20% aqueous NaOH solution. The reaction mixture was further maintained at 105° C. for 30 minutes, and the mixture was cooled to room temperature. Water was added to the mixture to thereby adjust the solid content to about 30% by mass.

The thus-prepared polycondensation product of Comparative Example 1 was subjected to gel permeation chromatography, and the weight average molecular weight Mw was found to be 22,000.

Comparative Preparation Example 2

Preparation of Polycondensation Product of Comparative Example 2

A polycondensation product of Comparative Example 2 was prepared by the following procedure disclosed in Japanese Patent Application Publication (Translation of PCT Application) No. 2014-503667 (JP 2014-503667 A) (paragraph [0069] [Example 1.1]).

Firstly, 16.92 g of 2-phenoxyethanol (96%) was added to a reactor equipped with a jacket and a mechanical impeller at 70° C. While 2-phenoxyethanol was stirred, 9.60 g of polyphosphoric acid (80% in $P_2O_5$) was added to the reactor. The mixture was stirred at 80° C. for 30 minutes, and then 200 g of polyoxyethylene monophenyl ether (96%, Mn=5000 g/mol) was supplied. The mixture was then heated to 100° C. To the mixture, 6.10 g of concentrated sulfuric acid (96%), 9.36 g of formalin (37%), and 1.92 g of paraformaldehyde (94%) were added, and the resultant mixture was heated to 110 to 115° C. and stirred for two hours. Thereafter, the mixture was cooled to 60° C., and a 32% by mass aqueous sodium hydroxide solution was added to thereby neutralize the mixture to a pH of 9.1.

The thus-prepared polycondensation product of Comparative Example 2 was subjected to gel permeation chromatography, and the weight average molecular weight Mw was found to be 22,000.

<Polycarboxylic Acid-Based Polymer Q>

Preparation Example 6

Preparation of Polycarboxylic Acid-Based Polymer Q-1

«Preparation of Polyamidepolyamine-EO Adduct»

To a reactor equipped with a stirrer, 103 g (1.00 mole) of diethylenetriamine and 97.3 g (0.67 moles) of adipic acid were added and mixed with stirring in a nitrogen atmosphere provided by introduction of nitrogen. The mixture was heated to 150° C., and reaction was allowed to proceed for 20 hours until achievement of an acid value of 22 while water (i.e., a reaction product associated with condensation polymerization) was removed. Subsequently, 1.1 g of hydroquinone methyl ether and 27.5 g (0.32 moles) of methacrylic acid were added, and then reaction was allowed to proceed for 10 hours at the same temperature (150° C.), to thereby yield 187 g of polyamidepolyamine (melting point: 122° C., acid value: 23) together with 42 g (total) of water generated by the reaction.

The entire amount of the polyamidepolyamine was dissolved in 272 g of water, and the solution was heated to a temperature of 50° C. At the same temperature (50° C.), 220 g of ethylene oxide (corresponding to 3.0 moles relative to the total amino residue containing unreacted amino group) was sequentially introduced over four hours, followed by aging for two hours, to thereby prepare 680 g of a polyamidepolyamine-EO adduct (solid content: 60%).

«Preparation of Polycarboxylic Acid-Based Polymer Q-1»

To a reactor equipped with a stirrer, 180 g of water was added, and nitrogen was introduced so as to achieve a nitrogen atmosphere in the interior of a synthesis system, followed by heating to a temperature of 80° C. To the synthesis system were added dropwise a mixture of 150 g of water, 98.2 g of the polyamidepolyamine-EO adduct, 72.0 g of methacrylic acid, 60.9 g of short-chain methoxypolyethylene glycol monomethacrylate (short-chain MPEGM, molecular weight: 1,000), and 183 g of long-chain methoxypolyethylene glycol monomethacrylate (long-chain MPEGM, molecular weight: 2,000) (in the case where methacrylic acid is in the form of an Na salt, the calculated proportions of polyamidepolyamine-EO adduct: methacrylic acid: short-chain MPEGM: long-chain MPEGM are 15% by mass: 23% by mass: 15% by mass: 47% by mass, 100% by mass in total) and 66.4 g of a 5% aqueous thioglycolic acid solution over two hours each, and 123 g of a 5% aqueous sodium persulfate solution over three hours. The resultant mixture was then aged for two hours and cooled. Thereafter, the mixture was neutralized to a pH of 7 with a 48% aqueous NaOH solution, to thereby prepare 1,029 g of a polycarboxylic acid-based polymer Q-1. The polycarboxylic acid-based polymer Q-1 was subjected to GPC molecular weight measurement, and the weight average molecular weight Mw was found to be 46,000.

Preparation Example 7

Preparation of Polycarboxylic Acid-Based Polymer Q-2

«Preparation of Polycarboxylic Acid-Based Polymer Q-2»

To a reactor equipped with a stirrer, 314 g of water was added, and nitrogen was introduced so as to achieve a nitrogen atmosphere in the interior of a synthesis system, followed by heating to a temperature of 80° C. To the synthesis system were simultaneously added dropwise the following three liquids over two hours: a mixture of 61 g of water, 6.0 g of acrylic acid, 18.7 g of methacrylic acid, 169 g of methoxypolyethylene glycol monomethacrylate (MPEGM, molecular weight: about 2,000), and 169 g of methoxypolyethylene glycol monoacrylate (MPEGA, molecular weight: about 1,000), 78.4 g of a 5% aqueous ammonium thioglycolate solution, and 78.4 g of a 5% aqueous ammonium persulfate solution. After completion of the dropwise addition, 42.7 g of the polyamidepolyamine-EO adduct prepared above in Preparation Example 6 was added dropwise over 30 minutes, and 39.2 g of a 5% aqueous ammonium persulfate solution was added dropwise over one hour (the proportions by mass of these solid contents; polyamidepolyamine-EO adduct: acid (total of acrylic acid and methacrylic acid): MPEGM: MPEGA=6% by mass: 8% by mass: 43% by mass: 43% by mass, 100% by mass in total). The resultant mixture was then aged for two hours and cooled. Thereafter, the mixture was neutralized to a pH of 6 with a 48% aqueous NaOH solution, to thereby prepare 1,000 g of a polycarboxylic acid-based polymer Q-2. The polycarboxylic acid-based polymer Q-2 was subjected to GPC molecular weight measurement, and the weight average molecular weight Mw was found to be 42,000.

[Concrete Test]

On the basis of the formulations shown in Table 2, fresh concrete materials were prepared according to JIS A 1138. A biaxial forced mixer having a nominal capacity of 100 L was used for kneading, and a concrete production amount was adjusted to 50 L for each batch.

Firstly, a powder, a fine aggregate, a coarse aggregate, and an admixture (polycondensation product, polycarboxylic acid-based polymer) were dissolved in mixing water, and the resultant mixture was added to the mixer. Kneading was performed for a predetermined period of time; specifically, 180 seconds for compositions Nos. 1 and 2, 150 seconds for compositions Nos. 3 to 5, and 90 seconds for composition No. 6.

The concrete compositions prepared through the aforementioned procedure were tested according to JIS A 1101 and JIS A 1150. In the concrete compositions Nos. 1 to 5, slump flow at an elapsed time of 0 minute was measured, and 50 cm flow time was measured. In the concrete composition No. 1, the state of concrete was observed after flowing. After measurement of the slump flow, each sample was placed in a summit mold having dimensions of ϕ15 cm×30 cm and vibrated by a table vibrator for 60 seconds. Thereafter, the appearance of the upper surface of the test sample was observed (the concrete compositions Nos. 2 to 5). The air content of each of these samples was measured according to JIS A 1128 (the concrete compositions Nos. 1 to 5).

In the concrete composition No. 6, slumps were measured according to JIS A 1101 and JIS A 1150 at elapsed times of 0 and 30 minutes, and the air content was measured according to JIS A 1128. In addition, bleeding amount was measured according to JIS A 1123, and bleeding rate was calculated.

Concrete setting time was measured according to JIS A 1147 (the concrete compositions Nos. 1, 2, and 6).

Specimens for a compressive strength test were prepared according to JIS A 1132, and compressive strength was measured according to JIS A 1108 at week 1 (1W) and week 4 (4W) (the concrete compositions Nos. 1 to 3 and 6).

When each specimen for the compressive strength test was removed from a formwork after hardening, the upper surface of the specimen was observed for evaluation of upper appearance after hardening or concrete product appearance (the concrete compositions Nos. 2 to 5).

The temperature of each fresh concrete material used for the aforementioned test was 20±3° C.

The test results of the concrete compositions are shown in Tables 3 to 7.

TABLE 2

| | | | | Concrete Composition | | | | | | |
|---|---|---|---|---|---|---|---|---|---|---|
| | | | | Unit amount (kg/m³) | | | | | | External |
| | | Fine | | | | | | | | mixing |
| | Water/powder | aggregate | | Powder (B) | | | Fine aggregate (S) | | Coarse aggregate (G) | Carbon |
| Composition No. | ratio W/B (%) | rate s/a (%) | Water (W) | Cement (C) | Tankaru (P) | Fly ash (FA) | Mountain sand | Crushed sand | Limestone | Crushed stone | black (C.B.) |
| 1 | 30.0 | 47.0 | 165 | 550 | — | — | 758 | — | — | 862 | — |
| 2 | 30.0 | 47.0 | 165 | 550 | — | — | 758 | — | — | 862 | 50 g/m³ |
| 3 | 30.0 | 42.3 | 165 | 273 | 277 | — | — | 672 | — | 917 | — |
| 4 | 35.0 | 48.5 | 165 | 330 | — | 142 | 793 | — | 868 | — | — |
| 5 | 35.0 | 48.5 | 165 | 472 | — | — | — | 845 | — | 897 | — |
| 6 | 50.0 | 50.7 | 175 | 350 | — | — | 896 | — | 870 | — | — |

[Materials used]
Water (W): tap water
Cement (C): ordinary portland cement, density: 3.16 g/cm³ (available from Taiheiyo Cement Corporation)
Fly ash (FA): fly ash type II (available from JPec Takehara Company, density: 2.28 g/cm³)
Tankaru (P): calcium carbonate, density: 2.71 g/cm³ (available from Kotegawa Sangyo Co., Ltd.)
Fine aggregate (S): mountain sand (produced in Kimitsu, density: 2.62 g/cm³, F.M. = 2.57)
crushed sand (produced in Sakuragawa, density: 2.64 g/cm³, F.M. = 2.85)
Coarse aggregate (G): limestone (produced in Hachinohe, density: 2.70 g/cm³, coarse aggregate size: 5 to 20 mm, solid volume percentage: 62.1%)
crushed stone (hard crushed sandstone 2005, produced in Sakuragawa, density: 2.64 g/cm³, coarse aggregate size: 5 to 20 mm, solid volume percentage: 57.5%)
Carbon black (C.B.): MA-100, available from Mitsubishi Chemical Corporation

TABLE 3

| | | Concrete Test Results (Composition No. 1) | | | | | | | | |
|---|---|---|---|---|---|---|---|---|---|---|
| | | | | Fresh properties | | | | | | |
| | Polymer | Polycondensation | 50 cm | Slump flow | Air content | Appearance | Setting time | | Compressive strength | |
| | [Q-1]*¹ | product | flow time | (cm) | (%) | after | Initiation | Completion | 1 W | 4 W |
| | C × %*² | Type | C × %*² | 0 min | 0 min | 0 min | flowing*³ | (hr:min) | (hr:min) | (N/mm²) | (N/mm²) |
| Example 1-1 | 0.55 | 6 | 0.15 | 10.2 | 70.0 | 1.9 | ○ | 4:35 | 6:10 | 74.1 | 92.2 |
| Example 1-2 | 0.55 | 7 | 0.15 | 10.3 | 69.5 | 1.8 | ○ | 4:20 | 5:55 | 76.4 | 94.3 |
| Example 1-3 | 0.55 | 8 | 0.15 | 10.6 | 70.5 | 1.7 | ○ | 4:45 | 6:27 | 73.5 | 93.6 |
| Example 1-4 | 0.55 | 10 | 0.15 | 10.1 | 68.0 | 1.6 | ○ | 4:41 | 6:32 | 73.6 | 92.1 |
| Example 1-5 | 0.55 | 11 | 0.15 | 10.7 | 67.5 | 1.8 | ○ | 4:43 | 6:25 | 74.6 | 94.7 |
| Comparative Example 1-1 | 0.55 | Comparative 1 | 0.15 | 8.6 | 66.5 | 2.0 | X | 5:45 | 7:25 | 72.6 | 88.6 |
| Comparative Example 1-2 | 0.55 | Comparative 2 | 0.15 | 8.9 | 65.0 | 2.0 | X | 5:27 | 7:06 | 70.8 | 87.5 |

*¹Polycarboxylic acid-based polymer Q-1
*²C × %: amount of addition relative to cement mass (% by mass)
*³Appearance after flowing: ○: no generation of separated water at the concrete periphery after flow measurement X: generation of separated water at the concrete periphery after flow measurement

TABLE 4

Concrete Test Results (Composition No. 2)

| | Polymer [Q-1]*1 | Polycondensation product | | Fresh properties | | | |
|---|---|---|---|---|---|---|---|
| | | | | 50 cm flow time | Slump flow (cm) | Air content (%) | Upper appearance after vibration*3 |
| | C × %*2 | Type | C × %*2 | 0 min | 0 min | 0 min | |
| Example 2-1 | 0.55 | 6 | 0.15 | 11.3 | 68.5 | 2.0 | ○ |
| Example 2-2 | 0.55 | 7 | 0.15 | 11.5 | 67.0 | 1.9 | ○ |
| Example 2-3 | 0.55 | 8 | 0.15 | 11.8 | 68.0 | 2.0 | ⊙ |
| Example 2-4 | 0.55 | 10 | 0.15 | 11.2 | 66.5 | 1.9 | ○ |
| Example 2-5 | 0.55 | 11 | 0.15 | 10.9 | 66.0 | 1.9 | ○ |
| Comparative Example 2-1 | 0.55 | Comparative 1 | 0.15 | 9.7 | 63.5 | 2.2 | X |
| Comparative Example 2-2 | 0.55 | Comparative 2 | 0.15 | 9.5 | 63.0 | 2.1 | X |

| | Setting time | | Compressive strength | | Hardening property Upper appearance after hardening*4 |
|---|---|---|---|---|---|
| | Initiation (hr:min) | Completion (hr:min) | 1 W (N/mm$^2$) | 4 W (N/mm$^2$) | |
| Example 2-1 | 4:32 | 6:06 | 73.7 | 91.6 | ○ |
| Example 2-2 | 4:18 | 5:49 | 76.4 | 93.6 | ○ |
| Example 2-3 | 4:48 | 6:26 | 73.4 | 93.9 | ⊙ |
| Example 2-4 | 4:44 | 6:34 | 73.3 | 92.3 | ○ |
| Example 2-5 | 4:47 | 6:21 | 74.1 | 95.7 | ○ |
| Comparative Example 2-1 | 5:51 | 7:28 | 72.2 | 87.5 | X |
| Comparative Example 2-2 | 5:35 | 7:09 | 70.2 | 86.7 | X |

*1Polycarboxylic acid-based polymer Q-1
*2C × %: amount of addition relative to cement mass (% by mass)
*3Upper appearance after vibration: ⊙: no blackening at the upper portion of a test piece, blackening area ratio: less than 1.0% ○: slight blackening at the upper portion of a test piece, blackening area ratio: 1.0 to 5.0% X: blackening at the upper portion of a test piece, blackening area ratio: 5.0% or more
*4Upper appearance after hardening: ⊙: no blackening at the upper portion of a test piece, blackening area ratio: less than 1.0% ○: slight blackening at the upper portion of a test piece, blackening area ratio: 1.0 to 5.0% X: blackening at the upper portion of a test piece, blackening area ratio: 5.0% or more

TABLE 5

Concrete Test Results (Composition No. 3)

| | Polymer [Q-1]*1 | Polycondensation product | | Fresh properties | | | | Compressive strength | | Hardening property |
|---|---|---|---|---|---|---|---|---|---|---|
| | | | | 50 cm flow time | Slump flow (cm) | Air content (%) | Upper appearance after vibration*3 | 1 W (N/mm$^2$) | 4 W (N/mm$^2$) | Appearance of concrete product |
| | C × %*2 | Type | C × %*2 | 0 min | 0 min | 0 min | | | | |
| Example 3-1 | 0.45 | 6 | 0.13 | 10.1 | 70.5 | 1.3 | ○ | 46.8 | 58.8 | No blackening |
| Example 3-2 | 0.45 | 7 | 0.13 | 10.7 | 69.0 | 1.2 | ○ | 46.3 | 59.1 | No blackening |
| Example 3-3 | 0.45 | 8 | 0.13 | 10.3 | 69.5 | 1.4 | ⊙ | 45.6 | 58.5 | No blackening |
| Example 3-4 | 0.45 | 10 | 0.13 | 10.9 | 69.0 | 1.2 | ○ | 46.2 | 58.6 | No blackening |
| Example 3-5 | 0.45 | 11 | 0.13 | 10.1 | 71.0 | 1.1 | ○ | 46.0 | 58.7 | No blackening |
| Comparative Example 3-1 | 0.45 | Comparative 1 | 0.13 | 8.7 | 68.5 | 1.6 | X | 41.8 | 52.5 | Blackening |
| Comparative Example 3-2 | 0.45 | Comparative 2 | 0.13 | 8.5 | 68.0 | 1.8 | X | 41.6 | 53.0 | Blackening |

*1Polycarboxylic acid-based polymer Q-1
*2C × %: amount of addition relative to cement mass (% by mass)
*3Upper appearance after vibration: ⊙: no blackening at the upper portion of a test piece, blackening area ratio: less than 1.0% ○: slight blackening at the upper portion of a test piece, blackening area ratio: 1.0 to 5.0% X: blackening at the upper portion of a test piece, blackening area ratio: 5.0% or more

TABLE 6

Concrete Test Results (Compositions No. 4 and No. 5)

|  | | | | Fresh properties | | | | |
| --- | --- | --- | --- | --- | --- | --- | --- | --- |
|  | Polymer [Q-1]*[1] | Polycondensation product | | 50 cm flow time | Slump flow (cm) | Air content (%) | Upper appearance after | Hardening property Upper appearance |
| Composition | C × %*[2] | Type | C × %*[2] | 0 min | 0 min | 0 min | vibration*[3] | after hardening*[4] |
| Example 4-1 | 4 | 0.50 | 8 | 0.14 | 6.2 | 69.5 | 1.5 | ⊙ | ⊙ |
| Example 4-2 | 4 | 0.50 | 10 | 0.14 | 6.1 | 68.5 | 1.7 | ○ | ○ |
| Comparative Example 4-1 | 4 | 0.50 | Comparative 1 | 0.14 | 4.6 | 67.0 | 1.8 | X | X |
| Example 5-1 | 5 | 0.50 | 8 | 0.14 | 4.8 | 69.5 | 1.9 | ⊙ | ⊙ |
| Example 5-2 | 5 | 0.50 | 10 | 0.14 | 4.7 | 70.0 | 2.0 | ○ | ○ |
| Comparative Example 5-1 | 5 | 0.50 | Comparative 1 | 0.14 | 3.7 | 65.0 | 2.5 | X | X |

*[1]Polycarboxylic acid-based polymer Q-1
*[2]C × %: amount of addition relative to cement mass (% by mass)
*[3]Upper appearance after vibration: ⊙: no blackening at the upper portion of a test piece, blackening area ratio: less than 1.0% ○: slight blackening at the upper portion of a test piece, blackening area ratio: 1.0 to 5.0% X: blackening at the upper portion of a test piece, blackening area ratio: 5.0% or more
*[4]Upper appearance after hardening: ⊙: no blackening at the upper portion of a test piece, blackening area ratio: less than 1.0% ○: slight blackening at the upper portion of a test piece, blackening area ratio: 1.0 to 5.0% X: blackening at the upper portion of a test piece, blackening area ratio: 5.0% or more

TABLE 7

Concrete Test Results (Composition No. 6)

| | Polymer [Q-1]*[1] | Polycondensation product | | Fresh properties | | | | Setting time | Compressive strength |
| --- | --- | --- | --- | --- | --- | --- | --- | --- | --- |
| | | | | Elapsed time | Slump | Air content | Bleeding Upper: (cm³/cm³) | Upper: initiation Lower: completion | Upper: 1 W Lower: 4 W |
| | C × %*[2] | Type | C × %*[2] | (min) | (cm) | (%) | Lower: rate (%) | (hr:min) | (N/mm²) |
| Example 6-1 | 0.5 | 6 | 0.12 | 0 | 23.0 | 5.2 | 0.14 | 5:35 | 30.5 |
| | | | | 30 | 20.5 | 4.2 | 3.0 | 7:00 | 41.0 |
| Example 6-2 | 0.5 | 7 | 0.12 | 0 | 22.5 | 4.5 | 0.11 | 5:05 | 31.1 |
| | | | | 30 | 22.0 | 3.9 | 2.7 | 6:35 | 41.5 |
| Example 6-3 | 0.5 | 8 | 0.12 | 0 | 23.0 | 5.3 | 0.14 | 5:50 | 30.6 |
| | | | | 30 | 20.5 | 3.9 | 2.9 | 7:55 | 40.6 |
| Example 6-4 | 0.5 | 10 | 0.12 | 0 | 23.0 | 4.7 | 0.15 | 5:45 | 30.8 |
| | | | | 30 | 20.5 | 4.0 | 3.1 | 7:50 | 42.4 |
| Example 6-5 | 0.5 | 11 | 0.12 | 0 | 23.0 | 4.5 | 0.15 | 5:55 | 30.1 |
| | | | | 30 | 22.0 | 4.3 | 3.0 | 7:45 | 40.7 |
| Comparative Example 6-1 | 0.5 | Comparative 1 | 0.12 | 0 | 21.0 | 5.3 | 0.24 | 6:30 | 29.2 |
| | | | | 30 | 16.5 | 3.3 | 4.6 | 8:15 | 40.1 |
| Comparative Example 6-2 | 0.5 | Comparative 2 | 0.12 | 0 | 20.5 | 5.7 | 0.26 | 6:25 | 29.5 |
| | | | | 30 | 16.0 | 3.1 | 4.7 | 8:10 | 40.3 |

*[1]Polycarboxylic acid-based polymer Q-2
*[2]C × %: amount of addition relative to cement mass (% by mass)

As shown in Tables 3 to 7, the results of the concrete test of the Examples using the polycondensation product P (formulations 6 to 8, 10, and 11) and the polycarboxylic acid-based polymer Q ([Q-1] and [Q-2]) forming the admixture for a hydraulic composition of the present invention demonstrated that the compositions of the Examples exhibited an increase in 50 cm flow time (in fresh properties); i.e., an improvement in viscosity, as compared with the results of the concrete test of the Comparative Examples using the polycondensation product falling outside the scope of the present invention. In particular, as shown by the results of appearance after flowing in Table 3 (composition No. 1), the composition of the Example exhibited an improvement in material separation resistance (appearance).

The comparison between the results of the concrete test of the Examples and the Comparative Examples demonstrated that the combination use of the polycondensation product P and the polycarboxylic acid-based polymer Q exhibited the effects of reducing the setting time during a hardening process, increasing the compressive strength, and suppressing blackening. As shown in Table 4 (composition No. 2), Table 5 (composition No. 3), and Table 6 (compositions No. 4 and No. 5), a significant difference between samples in terms of blackening on the upper appearance after vibration (in fresh properties) was also observed in the upper appearance after hardening.

Furthermore, the combination use of the polycondensation product P and the polycarboxylic acid-based polymer Q exhibited the effects of improving slump retention and achieving constant air content. As shown in Table 7 (composition No. 6), the combination use also exhibited the effect of considerably reducing the amount of bleeding.

As described above, each of the admixture for a hydraulic composition of the present invention and the combination for preparation of an admixture for a hydraulic composition of the present invention can exhibit high water-reducing ability even when incorporated into a concrete composition containing, for example, fly ash (FA). The admixture or the combination can suppress blackening on the surface of a concrete hardened body formed from the FA-containing composition, the blackening resulting from segregation of unburned carbon on the concrete surface. In addition, the admixture or the combination can suppress problems, including retardation of setting, bleeding, and a decrease in initial strength.

The invention claimed is:

1. An admixture for a hydraulic composition comprising:
a polycondensation product P containing a copolymer prepared by polycondensation of a monomer mixture containing a compound A of the following Formula (A), a compound B of the following Formula (B), and one or more aldehyde compounds C of the following Formula (C); and
a polycarboxylic acid-based polymer Q including a structural unit having an amino group and an imino group, and/or a structural unit having an amino group, an imino group, and an amido group:

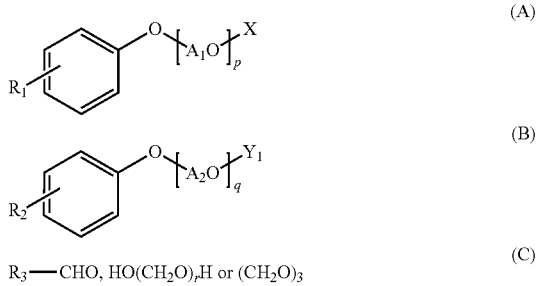

$R_3$—CHO, HO(CH$_2$O)$_r$H or (CH$_2$O)$_3$ (C)

wherein $R_1$ is a hydrogen atom, a $C_{1-24}$ alkyl group, or a $C_{2-24}$ alkenyl group; $A_1O$ is a $C_{2-4}$ alkylene oxide group; p is an average number of moles of alkylene oxide added and a number of 1 to 300; and X is a hydrogen atom, a $C_{1-10}$ alkyl group, or a $C_{2-24}$ acyl group;
$R_2$ is a $C_{4-24}$ alkyl group or a $C_{4-24}$ alkenyl group; $A_2O$ is a $C_{2-4}$ alkylene oxide group; q is an average number of moles of alkylene oxide added and a number of 1 to 300; and
$Y_1$ is a phosphate ester group; and
$R_3$ is a hydrogen atom, a carboxy group, a $C_{1-10}$ alkyl group, a $C_{2-10}$ alkenyl group, a phenyl group, a naphthyl group, or a heterocyclic group; and r is a number of 1 to 100.

2. The admixture for a hydraulic composition according to claim 1, wherein the monomer mixture further contains a compound D of the following Formula (D):

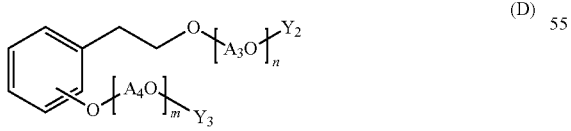

wherein $A_3O$ and $A_4O$ are each independently a $C_{2-4}$ alkylene oxide group; m and n are each independently an average number of moles of alkylene oxide added and a number of 0 to 300, and m and n satisfy the following relation: m+n≥1; and $Y_2$ and $Y_3$ are each independently a hydrogen atom or a phosphate ester group.

3. The admixture for a hydraulic composition according to claim 2, wherein the monomer mixture contains the compound A, the compound B, and the compound D in proportions by mole; i.e., the compound A:the compound B:the compound D of 0.1 to 2:0.1 to 4:0 to 2, and the ratio by mole of the total of the compound A, the compound B, and the compound D to the compound C; i.e., (the compound A+the compound B+the compound D):

the compound C is 1 to 10:10 to 1.

4. The admixture for a hydraulic composition according to claim 1, wherein the monomer mixture contains two or more compounds A of Formula (A).

5. The admixture for a hydraulic composition according to claim 1, wherein the monomer mixture contains two or more compounds B of Formula (B).

6. The admixture for a hydraulic composition according to claim 1, wherein the structural unit having an amino group and an imino group is derived from a polyalkylenepolyamine.

7. The admixture for a hydraulic composition according to claim 1, wherein the structural unit having an amino group, an imino group, and an amido group is derived from a polyamidepolyamine.

8. The admixture for a hydraulic composition according to claim 6, wherein the polyalkylenepolyamine contains a polyalkylene oxide-added polyalkylenepolyamine.

9. The admixture for a hydraulic composition according to claim 7, wherein the polyamidepolyamine contains a polyalkylene oxide-added polyamidepolyamine.

10. The admixture for a hydraulic composition according to claim 6, wherein the polyalkylenepolyamine has a molecular weight of 900 to 10,000.

11. The admixture for a hydraulic composition according to claim 7, wherein the polyamidepolyamine has a molecular weight of 900 to 10,000.

12. The admixture for a hydraulic composition according to claim 1, wherein the polycarboxylic acid-based polymer Q includes a copolymer unit prepared by copolymerization of a monomer mixture containing a monomer of the following Formula (1) and a monomer of the following Formula (2), and the structural unit having an amino group and an imino group, and/or the structural unit having an amino group, an imino group, and an amido group

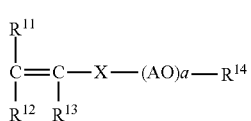

wherein $R^{11}$, $R^{12}$, $R^{13}$, and $R^{14}$ are each independently a hydrogen atom or a $C_{1-22}$ hydrocarbon group; X is —COO—, —CON<, or —(CH$_2$)$_b$O—; AO is a $C_{2-4}$ alkylene oxide group; a is an average number of moles of alkylene oxide added and a number of 1 to 200; and b is a number of 1 to 20; and

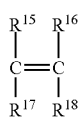

wherein $R^{15}$, $R^{16}$, $R^{17}$, and $R^{18}$ are each independently a hydrogen atom, a glycidyl group, a $C_{1-22}$ hydrocarbon group, —$(CH_2)_c$—COOM, —COOM, —COOR$^{19}$, wherein $R^{19}$ is a $C_{1-22}$ hydrocarbon group, —$(CH_2)_c$—COOM, —COOM, or a glycidyl group, or $R^{15}$ and $R^{16}$ or $R^{17}$ and $R^{18}$ form an acid anhydride together with the >C=C< group in Formula (2); c is a number of 1 to 20; and M is a hydrogen atom, an alkali metal, an alkaline earth metal, ammonium, or an alkanolamine.

13. The admixture for a hydraulic composition according to claim 1, wherein the mass ratio of the polycondensation product P to the polycarboxylic acid-based polymer Q; i.e., P: Q is 1:99 to 99:1.

14. A combination for preparation of an admixture for a hydraulic composition, the combination comprising a polycondensation product P containing a copolymer prepared by polycondensation of a monomer mixture containing a compound A of the following Formula (A), a compound B of the following Formula (B), and one or more aldehyde compounds C of the following Formula (C); and a polycarboxylic acid-based polymer Q including a structural unit having an amino group and an imino group, and/or a structural unit having an amino group, an imino group, and an amido group:

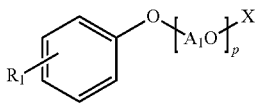
(A)

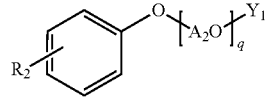
(B)

$R_3$—CHO, HO(CH$_2$O)$_r$H or (CH$_2$O)$_3$ (C)

wherein $R_1$ is a hydrogen atom, a $C_{1-24}$ alkyl group, or a $C_{2-24}$ alkenyl group; $A_1O$ is a $C_{2-4}$ alkylene oxide group; p is an average number of moles of alkylene oxide added and a number of 1 to 300; and X is a hydrogen atom, a $C_{1-10}$ alkyl group, or a $C_{2-24}$ acyl group;

$R_2$ is a $C_{4-24}$ alkyl group or a $C_{4-24}$ alkenyl group; $A_2O$ is a $C_{2-4}$ alkylene oxide group; q is an average number of moles of alkylene oxide added and a number of 1 to 300; and $Y_1$ is a phosphate ester group; and $R_3$ is a hydrogen atom, a carboxy group, a $C_{1-10}$ alkyl group, a $C_{2-10}$ alkenyl group, a phenyl group, a naphthyl group, or a heterocyclic group; and r is a number of 1 to 100.

* * * * *